3 Sheets--Sheet 1.
J. PATTISON.
Blast-Furnaces.
No. 133,718. Patented Dec. 10, 1872.
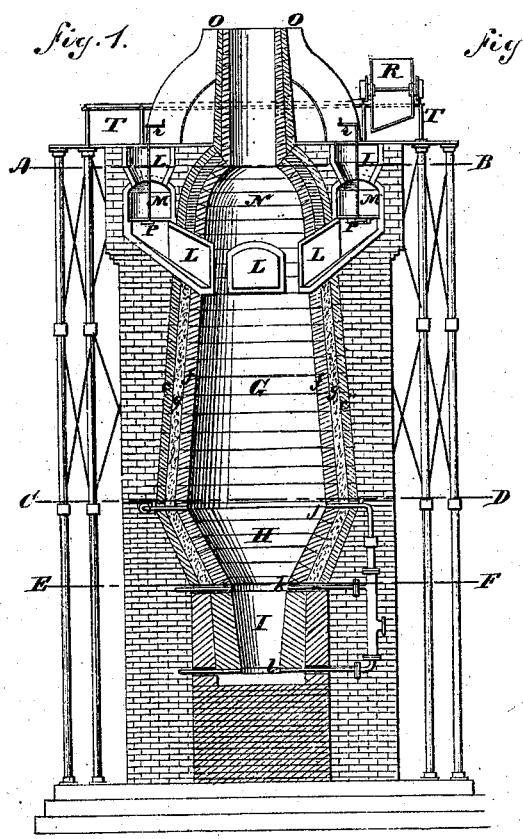
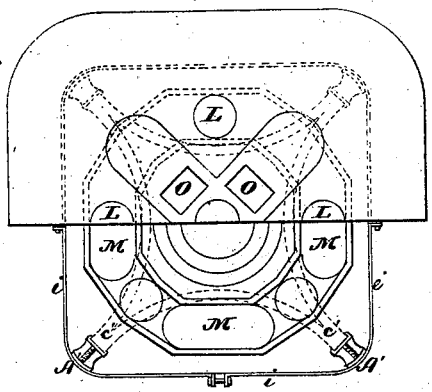
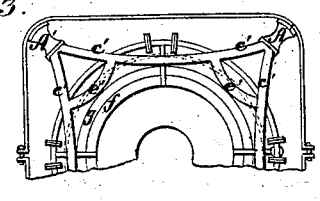
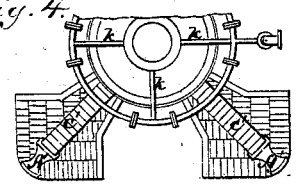
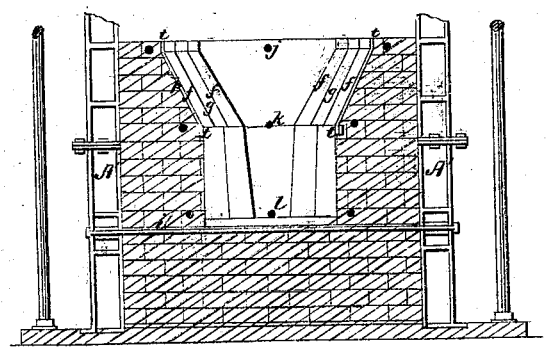
Witnesses.
C. F. Brown
N. H. Ellsworth
Inventor.
Juan Pattison
By Hill & Ellsworth
his Attys J. PATTISON.
Blast-Furnaces.

No. 133,718.

3 Sheets Sheet 2.

Patented Dec. 10, 1872.

Witnesses.

Inventor.
Juan Pattison
By Hill & Ellsworth
His Attys.

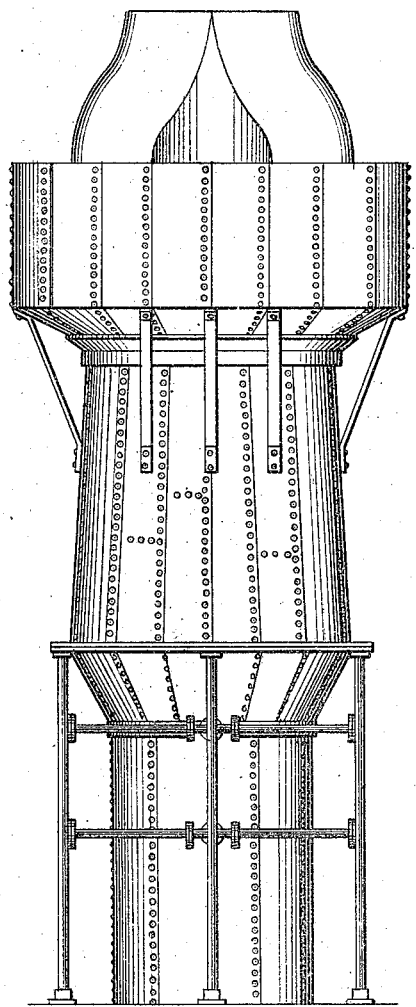

UNITED STATES PATENT OFFICE.

JUAN PATTISON, OF NEW YORK, N. Y., ASSIGNOR TO AMBROSE W. THOMPSON, OF SAME PLACE.

IMPROVEMENT IN BLAST-FURNACES.

Specification forming part of Letters Patent No. 133,718, dated December 10, 1872; antedated December 7, 1872.

*To all whom it may concern:*

Be it known that I, JUAN PATTISON, of the city, county, and State of New York, have invented a new and useful Improvement in Blast-Furnaces for Smelting Ores; and I do hereby declare the following to be a full, clear, and exact description of the same, reference being had to the accompanying drawing forming part of this specification, in which—

Figure 6:
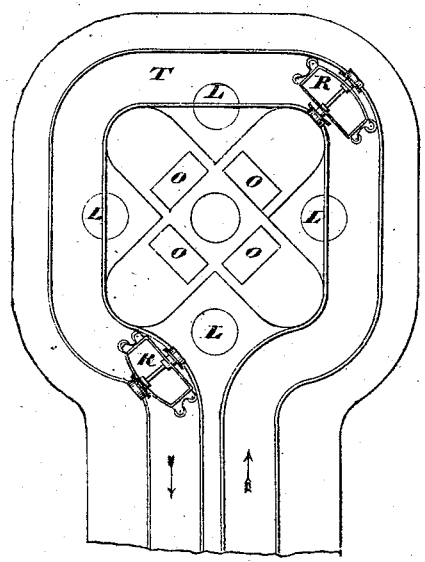

Figure 1 is a vertical section of a blast-furnace embodying my invention; Fig. 2, a half plan of top and half-section through line A B of Fig. 1; Fig. 3, a partial section through line C D of Fig. 1; Fig. 4, a partial section through line E F of Fig. 1; Fig. 5, a partial diagonal vertical section; Fig. 6, a plan of the top of the furnace, with columns for the gallery and tram-way; and Fig. 7, a side view of the furnace with the walls filled in with brick or other suitable material so as to give the whole a cylindrical form.

Similar letters of reference in the accompanying drawing denote the same parts.

The object of my invention is, first, to improve the construction of blast-furnaces for smelting ores, so as to prevent the cracking of the walls from unequal expansion and contraction, and thereby to confine the blast so that it shall fully perform its function; secondly, to improve the means for charging the furnace; thirdly, to improve the arrangement of the tuyeres so as to reduce the ores in a more perfect manner than heretofore.

To these several ends, respectively, my invention consists, first, in strengthening the walls of the furnace by means of a system of horizontal arches, vertical iron posts, and circumferential bands combined together, as hereinafter described; secondly, in constructing the tram-way, the cars, and the gates and conducting-chutes so as to operate in connection with each other, as hereinafter specified; thirdly, in arranging a series of tuyeres at or near the lower end of the crucible, another, at or near the top of the crucible, and a third, at or near the top of the boshes, as and for the purpose hereinafter set forth; fourthly, in the arrangement of a set of ovens around or in the upper part of the furnace, in connection with the other parts of the furnace, as hereinafter described; and, lastly, in the details of construction, as hereinafter described.

Figure 7:
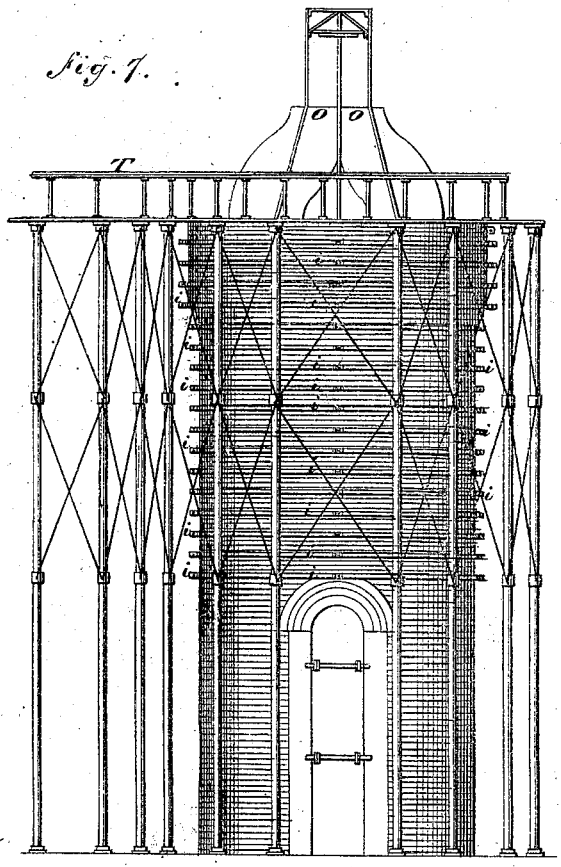

In the drawing, I is the crucible, where the molten metal collects; H, the boshes; G, the cone; N, the top of the charge; and $f$, the shirt-lining or fire-wall of the furnace. A′ A′ are three or more stout iron pillars, constructed in sections, suitably bolted together, and embedded in the masonry of the walls, extending from the bottom to the top of the furnace. Outside of the shirt $f$, above the line C D, is a vertical wall, $c'$, composed of blocks of fire-clay or other suitable material, arranged in such a manner that a cross-section at any elevation will show three or more horizontal arches, the key-stones of which support the fire-wall, while the ends abut against the iron pillars A′, as represented in Figs. 2, 3, 4, and 5. Small supplementary walls $e'$ of a similar form may be arranged inside the walls $c'$, as shown in Fig. 3, forming arches, whose ends abut against the walls $c'$, while their key-stones support the shirt or fire wall. Iron bands $i\ i$ are placed around the structure, above the line C D, to support the posts A′, and assist them and the arches in resisting the expansion of the furnace-walls, diagonal iron rods $i'$ serving for a similar purpose below the crucible. Between the arched walls $c'\ e'$ and the bands $i\ i$ the spaces are filled up compactly with brick, stone, or fire-clay; or the whole furnace may be covered with iron, as shown in Fig. 8, and the spaces may be filled with any suitable non-conducting material. Between the walls $c'\ e'$ and the shirt $f$ the spaces are filled, as shown at $g$, with sand or any other available non-conductor or poor conductor of heat, to serve as a cushion for the fire-wall. As the latter expands under the great heat to which it is subjected it presses the sand-cushion $g$ against the arches $c'\ e'$, which transmit the force to the pillars A′, where it is taken up by the bands $i$, and the walls of the furnace are thereby prevented from cracking. The boshes H are constructed of two courses of fire-brick, with a sand-cushion between them, supported in a basin, $p$, made of thick rolled iron, cut into suitable plates and riveted together, the whole forming an inverted segment of a hollow cone. To the extremities of the basin, on the outer side, I attach strong flanges $t\ t'$, and to these is riveted an annular chamber or pipe, connected with the jets $j\ k\ l$ to facilitate the renewing of said jets without the necessity of interrupting the operation of the furnace. The walls of the furnace below the line C D may be filled out, as shown in Fig. 7; or they may be constructed with only the corner abutments, as shown in Fig. 4, the spaces between such abutments not being filled out. M M are ovens, arranged in passages L leading from the top of the furnace to the interior of the cone at or near the upper end of the charge. These ovens are provided with flues O, and also with grates P, which can be tipped by means of rods $r$ extending to the top of the furnace, or to any other convenient point. The flux, &c., is brought to the furnace by means of cars R running upon the tram-way T, and discharging their loads into the passages L either automatically or otherwise. A good method of construction is to incline the tram-way just sufficiently to enable the cars to run by their own gravity, or else to attach them to cables, by which they can be moved around the furnace, the cars being mounted on a single pair of wheels and provided with small guide-trucks to assist in following the curves of the track. The cars are also to be constructed with inclined hinged bottoms, locked or latched at their lower edge in such a manner that when over the passages L they will unlatch and dump the load through the passages into the ovens M. When in the ovens the materials are partially or completely calcined and prepared for admission to the furnace, the volatile matters —such as carbonic acid, sulphur, water, &c.— being driven off in the form of gases or vapors and escaping through the flues O. When the furnace requires a fresh supply the grates P are tipped by the rod $r$, and the calcined or calcining materials allowed to fall through in quantities suitable for the purpose, after which the grates are closed again and a new supply furnished to the ovens from the cars R.

In ordinary furnaces the load begins to lose its moisture and volatile gases at an elevation a little below the line of the flues L of my improved furnace. Beneath that point the load absorbs caloric, and calcination begins and continues to the boshes, where the ore begins to be converted from sesquioxide to metallic iron. The metallic iron fuses and drops into the crucible by its own gravity, and from the the crucible it is allowed to flow, at the proper time, into sand, to cool into pigs. The conversion is effected ordinarily by forcing hot or cold blasts through jets at the bottom of the crucible at a pressure ranging between eight and twelve pounds to the square inch.

In my invention, however, the materials to be reduced—such as ore, flux, &c.—are prepared in the ovens M, as above described, the calcination being advanced, if not completed, before they are admitted into the furnace, by which means a large portion of the caloric is utilized and made available in the furnace that would otherwise be allowed to escape, or be used only for heating blasts or raising steam for power purposes. The elements thus prepared enter the furnace already at an advanced stage of the process, and, by the introduction of a blast of hot or cold air through the upper jets $j$ at a moderate pressure, the fusion of the iron, &c., is accelerated, and that which is accomplished at the bottom of the boshes in ordinary furnaces takes place before the load reaches the boshes in my improved furnace. As the fusing load descends into the boshes it is supplied with additional blasts from the jets $k$, and metallic iron is produced and collected in the crucible, the scoria, slag, and earthy bases being kept floating on the top by the third series of jets, $l$, at the bottom, which forces air through the mass of molten metal. To more thoroughly cleanse the metal in the crucible I introduce a powerful current of air at or near the bottom of the crucible, suspending the introduction of air through the upper jets $j\ k$ during this part of the operation by means of the appliances provided for the purpose. The introduction of an adequate quantity of air in this manner at a high pressure produces an intense heat by the combination of the oxygen of the air with the carbon contained in the iron. The rapid union of these elements adds to the temperature of the metal, and as the carbon diminishes the oxygen is enabled to combine with the iron, solving and driving off the elements that adhere thereto, such as sulphuric acid, &c. While the powerful currents of air cause a violent ebullition in the crucible and the heat drives off the impurities from the iron these mingle with the slag, silica, and other floating matters remaining on the surface of the metal, and leaving it in a condition to be drawn off, comparatively pure, into metallic molds properly lined, to set ready for the squeezers and rolls.

Having thus described my invention, what I claim as new, and desire to secure by Letters Patent, is—

1. In a furnace, the combination of the supporting-arches $c'$ with the corner-posts $A'$ and the bands $i$, or an iron covering, as shown in Fig. 8, substantially as and for the purposes set forth.

2. The supplementary arches $e'$ arranged in connection with the arches $c'$, substantially as and for the purposes set forth.

3. The arrangement of the tram-way and dumping-cars, in combination with the passages L and ovens M, substantially as and for the purpose set forth.

4. The furnace having the cone, the boshes, the crucible, the ovens, and the three sets of tuyeres, all constructed and arranged relatively to each other, substantially as described and shown, for the purpose specified.

JUAN PATTISON.

Witnesses:
 THO. SADLER,
 GEORGE M. SMITH.